April 24, 1945.  R. S. VINCENT  2,374,514
MANUFACTURE OF ELECTRIC CABLES
Filed Oct. 14, 1942   2 Sheets-Sheet 2
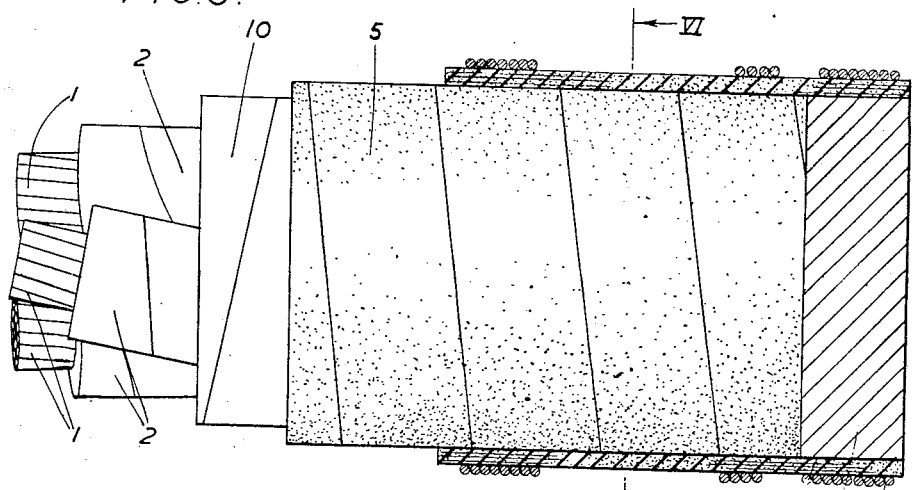
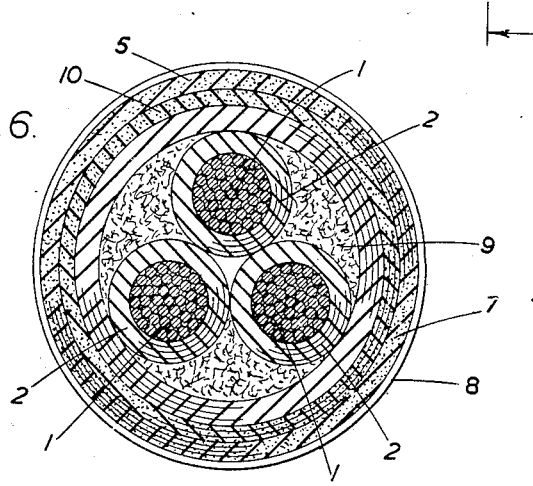
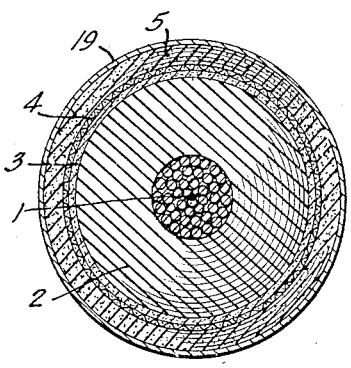
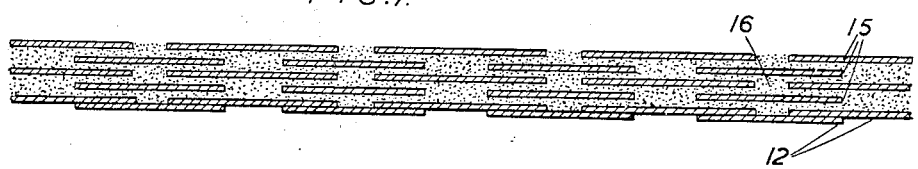
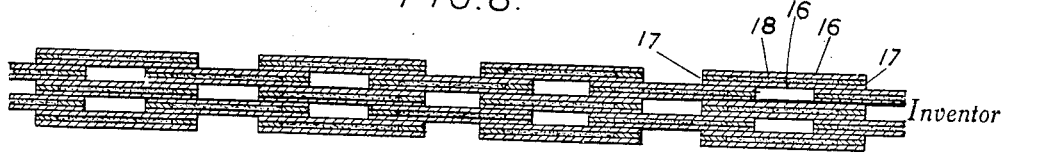
Inventor
RUSSELL S. VINCENT
By
Stebbins and Blenko
Attorneys Patented Apr. 24, 1945

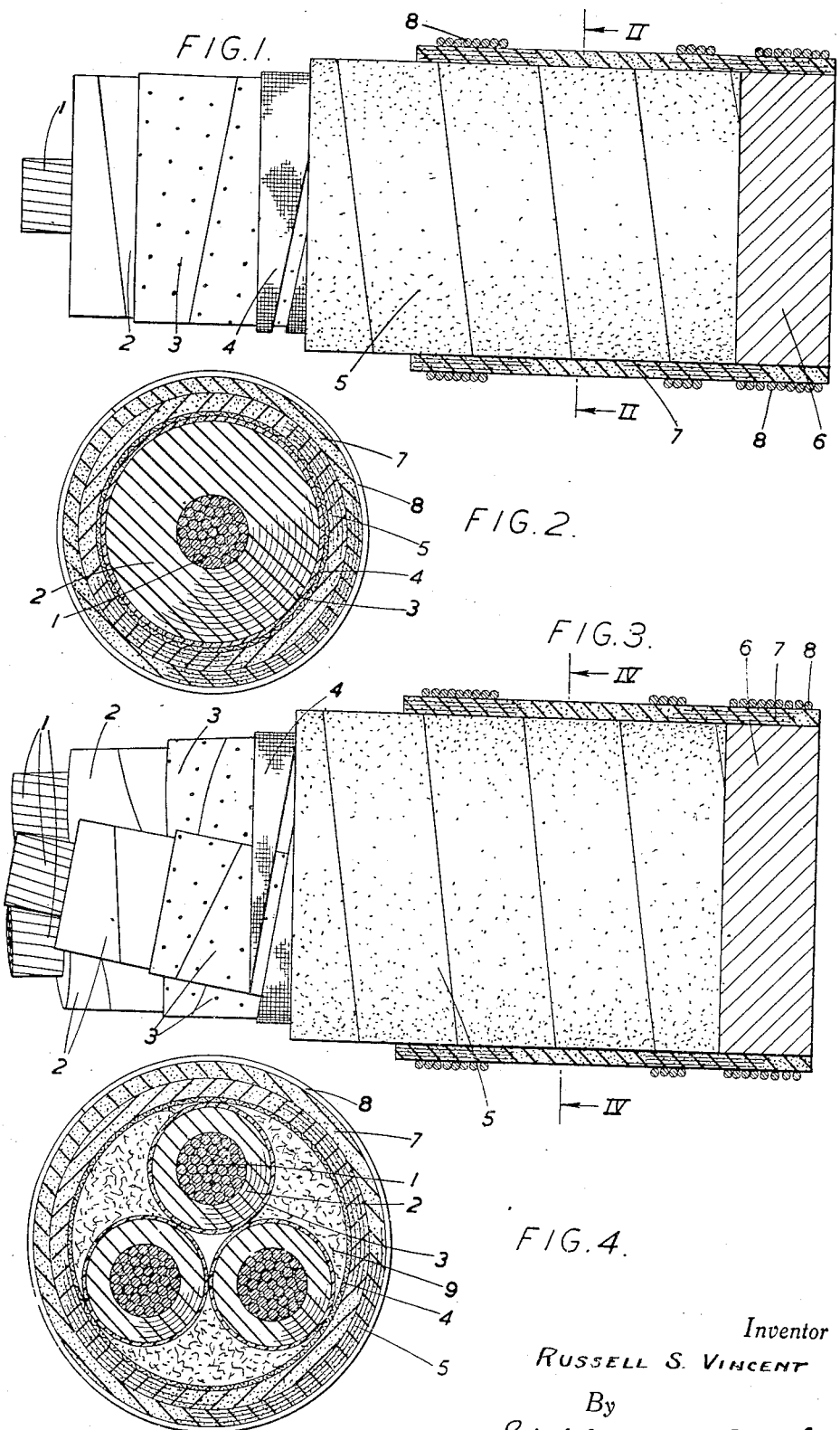

2,374,514

UNITED STATES PATENT OFFICE 2,374,514

MANUFACTURE OF ELECTRIC CABLES

Russell Swale Vincent, London, England, assignor to Callender's Cable & Construction Company Limited, London, England, a British company Application October 14, 1942, Serial No. 461,973
In Great Britain November 6, 1941

12 Claims. (Cl. 154—2.28)

This invention is concerned with the manufacture of electric cable which comprises an impregnated paper insulated conductor and is primarily intended to operate at very high voltages. By the present invention, we improve the impregnating procedure with the object of obtaining a cable having a very low dielectric loss. In this improved procedure the impregnant is filtered as it is about to enter the paper insulation, which when impregnated will form the dielectric. This is done by enclosing the paper insulated conductor within a porous envelope and forcing the impregnant, generally an oleaginous body that is liquid at the temperature of impregnation, inwardly through the wall of the envelope, whereby it is filtered, the filtrate only passing into the paper insulated conductor. When impregnation of the paper insulated conductor is complete the porous envelope surrounding the impregnated paper dielectric and constituting the filter, or at least the outer part thereof, is removed and the insulated conductor is enclosed within an envelope of liquid-impervious material, for instance, a lead sheath.

In the case of single core cables the porous envelope constituting the filter is preferably a more or less close fit on the screened core, or if no screen is employed, on the outer surface of the conductor dielectric. In the case of multi-core cables, except those having separately sheathed cores which will be treated as single core cables, a filter consisting of a porous envelope common to all cores will generally be used. This will be applied after the cores have been laid up together and after the belt insulation, if any, has been applied.

It will be appreciated that the impregnant must be constrained to pass into the insulated conductor (or conductors) only by way of the filter. This may be ensured either by continuing the porous walled envelope over the ends of the insulated conductor or by sealing the ends of the insulated conductor completely.

By impregnating the insulated conductor when enclosed in a filter envelope, we are able to remove traces of foreign bodies (for instance, metal particles), impurities and moisture, or the products of deterioration (for instance, products of oxidation) from the impregnant at the last stage of its movement towards the dielectric. It will be seen that the procedure ensures taking out of the impregnant anything which it has acquired while on its way from the usual purifying plant to and through the impregnating apparatus. As the result of this treatment the dielectric has an improved value as regards loss under alternating high electric stress.

The porous envelope serving as the filter conveniently comprises a laminated body of strip material surrounding the paper insulated conductor or group of conductors. This body preferably comprises other media assisting filtration and purification of the impregnating oil or compound. Suitable materials are the clays that are used for filtering, examples of which are kaolin and fuller's earth. The body is preferably built up of a plurality of helical lappings of strip material and the finely divided filter medium may be either embodied in the strip material during its manufacture or applied in powder or paste form between the lappings. In the former case the strip material will naturally be a porous material, for instance, paper. In the latter case, it is not essential to use a porous strip material, though it will generally be advantageous to do so.

The invention will be more fully described with the aid of the accompanying drawings which show by way of example, various forms of cable provided in accordance with our invention with means for filtering the impregnant immediately prior to its entry into the paper insulation.

In the drawings,

Figure 1 is an elevation, partly in section of an end portion of a length of filter covered single core cable, parts of which have been removed to expose the interior of the cable, Figure 2 is a cross-section taken on the line II—II in Figure 1 of the cable shown therein, Figures 3 and 4 are views corresponding to Figures 1 and 2 showing an end portion of a length of filter covered three core cable with separately screened cores, Figures 5 and 6 are views corresponding to Figures 1 and 2 showing an end portion of a length of filter covered three core belted type cable, and Figures 7 and 8 are diagrammatic fragmental longitudinal sections, showing two alternative forms of construction of our cable filter, the thickness of the strip material and the size of the spaces being greatly exaggerated.

Figure 9 is a cross-section of a single-core cable provided with a modified form of filter consisting of a layer of loaded paper and a surrounding layer of unloaded paper.

Referring firstly to Figures 1 and 2, it will be seen that the cable comprises a stranded conductor *I* surrounded by a laminated body of insulation *2* of the thickness required by the design of the cable. This body is built up in the usual way of a plurality of superposed helical lappings of paper tape. Directly over this insulation is a conductive screen consisting of a lapping of perforated metallised paper tape 3. A copper woven fabric tape 4, by which is meant a textile fabric tape into which copper wires have been woven, is applied helically over the tape 3 to serve as a binder and, when the cable is completed, to serve as an electrically conductive connection between the screen and a surrounding impervious envelope of conductive material, generally a lead sheath. Over the layer 4 are lapped other layers of paper to form a porous envelope 5 constituting a filter surrounding the paper insulated conductor. This paper is loaded during its manufacture with fuller's earth or other suitable filter clay. The thickness of this filter layer 5 may be of the order of one-tenth of an inch. To prevent the filter being by-passed by entry of impregnant through the ends of the cable length, each end is sealed by means of an impervious cylinder 6, for instance, a tinned copper cylinder, of the same diameter as the filter-covered cable, and of a covering 7 which overlaps the cylinder and an adjacent length of the filter layer 5. The covering 7 is built up of lappings of paper loaded with fuller's earth and is made secure by bindings 8 of stout wire or by any other suitable means.

The three cores of the cable shown in Figures 3 and 4 are of similar construction to the single core of the cable just described, in that each consists of a standard conductor 1, lapped paper insulation 2 and a conductive screen of perforated metallised paper tape 3. In this case, however, the copper woven fabric tape 4 is applied around the three screened cores after they have been laid up together with their paddings 9, and the porous envelope 5 of loaded paper forming the filter is then applied over the copper woven fabric tape, the ends being sealed in the same way as described with reference to Figures 1 and 2.

In the arrangement shown in Figures 5 and 6, the three paper insulated conductors are not screened but are laid up together with paddings 9. Around this assembly of cores is the wrapped paper belt insulation 10 and over this a filter covering 5 of wrapped loaded paper, sealed at its ends in the way previously described.

It will be appreciated that Figures 1–6 inclusive are not drawn strictly to scale and that the thickness of the metallised paper layer and that of the copper woven fabric tape layer have been exaggerated in order that the layers may be clearly shown.

Instead of building up the filter covering 5 of helical lappings of tapes of paper loaded during manufacture of the paper with a finely divided filter medium, such as china clay or fuller's earth, it can be built up of lappings of strip material, preferably a porous material such as paper, coated on one or both sides with a filter medium (e. g., china clay or fuller's earth) either before or during the lapping process or both before and during the lapping process, so as to provide a thin layer of the medium between superposed layers of strip material and, preferably, also to fill the spaces between adjacent turns, as shown diagrammatically in Figure 7 where 12 indicates the two outermost layers of dielectric paper and 15 the four innermost layers of filter paper, the filter media being shown conventionally at 16.

Alternatively the filter may be built up of helical lappings of composite strip comprising a layer of filter powder or paste sandwiched between two layers of porous tape. The form of filter shown diagrammatically in Figure 8, is built up of helical lappings of a composite strip comprising a pair of tapes 16 of paper or other porous material held in superposed spaced relationship by a pair of relatively narrow marginal tapes 17 and a filter medium 18 contained in the space bounded by the two superposed tapes 16 and the two relatively narrow marginal tapes 17. A composite strip of this form may be made by feeding the two outer strips 16 and their two spacer strips 17 down between a pair of horizontal rolls fed with, or immersed in, a filter medium in the form of a powder or paste made by mixing a filter powder with water, a non-aqueous volatile liquid or impregnating oil. The outer strips may be secured to the spacer strips by means of adhesive.

To provide a readily recognisable indication of the boundary between the dielectric and the filter envelope it is preferred to apply a coloured paper tape over the dielectric paper, or, if a screen is present, over the screen, before application of the strips to form the filter. This coloured paper is left on after removal of the filter envelope until the cable is about to be lead sheathed and consequently serves to protect the dielectric paper during the interval between impregnating it and lead sheathing it. To avoid any possible migration of filter medium into the impregnating liquid in which the core is immersed, an envelope 19 consisting of one or more layers of unloaded paper tape may be applied over the outer layer of the filter envelope, as shown, for instance, in Figure 9.

After the application of the filter envelope and the end caps, the cable is subjected to the usual processes of drying and impregnation. In the former process, air and moisture are removed through the external filter envelope by reducing the pressure on the outside of the cable and in the latter process the impregnating liquid passes into the dielectric paper only through the filter envelope, leaving impurities and foreign bodies therein. The impregnating process may, if desired be assisted by using a modified form of end cap in which provision is made for placing the stranded conductor in communication with evacuating plant. After impregnation has been completed the layers of paper or other material constituting the filter envelope are removed.

It will, of course, be appreciated that most of the impurities trapped in the filter will be in the outer part thereof and that there may be little or none left in the innermost part. Consequently, although it will generally be safer to do so, it is not always essential to remove all the layers of paper or other material constituting the filter in order to obtain by our invention a cable free from impurities introduced via the impregnating compound.

Proof of the improved power factor of cable manufactured according to the present invention has been obtained by processing at the same time and in the same vessel two experimental lengths of cable which were of identical construction except that one was provided with a porous envelope constituting a filter. The particular filter used on the filter covered experimental cable consisted of a 0.1 inch thick wall built up of tapes of paper which had been loaded with activated fuller's earth. The amount of fuller's earth in the loaded paper was approximately 12% by weight. The paper tapes were 6½ mils thick and 1⅛ of an inch in width, and were applied helically with the gaps between the papers as small as possible, the registration of the successive layers being 65/35. Before the filter layer was applied to the cable, a single paper tape, coloured blue, 1¼ inches wide, was applied helically to the cable with an overlap of 20%. A similar, but uncoloured, paper tape was applied finally over the 0.1 inch wall of loaded paper constituting the filter layer.

The two experimental lengths gave the following test results:

| Ambient temperature in °C. | Power factor at normal working voltage ||
|---|---|---|
| | Cable impregnated without filter layer | Cable impregnated through filter layer |
| 20 | 0.0027 | 0.0027 |
| 40 | 0.0026 | 0.0025 |
| 65 | 0.0023 | 0.0022 |
| 75 | 0.0030 | 0.0023 |
| 85 | 0.0041 | 0.0030 |
| 95 | 0.0052 | 0.0038 |

What I claim as my invention is:

1. In the manufacture of electric cable comprising a conductor having a dielectric of impregnated paper, enclosing a paper-insulated conductor within a porous envelope, forcing impregnating liquid radially inward through the wall of the porous envelope whereby to filter the said liquid and impregnate the paper-insulated conductor with the filtrate, and thereafter removing at least the outer part of said porous envelope and enclosing the impregnated paper-insulated conductor within an envelope of liquid-impervious material.

2. In the manufacture of electric cable comprising a conductor having a dielectric of impregnated paper, applying additional paper over the dielectric paper of the insulated conductor to form a porous envelope, forcing impregnating liquid radially inward through the wall of said envelope to filter said liquid and impregnate the dielectric paper with the filtrate, and thereafter removing at least the outer part of said porous envelope and applying to the impregnated paper-insulated conductor an impervious envelope.

3. A method of making an insulated electric cable, which comprises lapping a conductor with paper tapes to form thereon a dielectric layer of paper of appropriate thickness, applying further lappings of liquid-pervious material to form a porous filter layer surrounding the dielectric layer, impregnating the filter-covered, paper-insulated conductor by forcing impregnant radially inward through said filter layer whilst preventing entry of impregnant through the ends of the covered conductor, and thereafter removing at least the outer part of the porous filter layer and enclosing the impregnated paper insulated conductor within an impervious envelope.

4. A method of making an insulated electric cable which comprises lapping a conductor with paper tapes to form thereon a dielectric layer of paper of appropriate thickness, lapping the paper covered conductor with tapes of liquid-pervious material whilst feeding a filter medium into the interstices between the lappings of said liquid-pervious material, whereby to form a porous filter layer surrounding the dielectric layer, impregnating the filter-covered, paper-insulated conductor whilst preventing entry of impregnant through the ends of the covered conductor, and thereafter removing at least the outer part of the porous filter layer and enclosing the impregnated paper-insulated conductor within an impervious envelope.

5. A method of making an insulated electric cable which comprises lapping a conductor with paper tapes to form thereon a dielectric layer of paper of appropriate thickness, applying lappings of paper loaded with a filter medium to form a porous filter layer surrounding the dielectric layer, applying at least one lapping of unloaded paper over said porous filter layer to form an envelope enclosing said filter layer, impregnating the filter-covered, paper-insulated conductor whilst preventing entry of impregnant through the ends of the covered conductor, thereafter removing the envelope of unloaded paper and at least the outer part of the filter layer and enclosing the impregnated paper-insulated conductor within an impervious envelope.

6. A method of making an insulated electric cable, which comprises lapping a conductor with paper tapes to form thereon a dielectric layer of paper of appropriate thickness, applying a lapping of coloured paper over the said dielectric paper, applying further lappings of paper loaded with a filter medium to form a porous filter layer surrounding the layer of coloured paper, applying at least one lapping of unloaded paper over said porous filter layer to form an envelope enclosing said filter layer, impregnating the filter-covered, paper-insulated conductor whilst preventing entry of impregnant through the ends of the covered conductor, thereafter removing the envelope of unloaded paper and the filter layer to expose the layer of coloured paper, subsequently removing said coloured layer and immediately thereafter applying to the exposed impregnated paper-insulated conductor an impervious envelope.

7. In the manufacture of electric cable comprising a conductor having a dielectric of impregnated paper, enclosing a paper-insulated conductor within a tubular filter, forcing impregnating liquid radially inward through the said filter to filter the liquid and impregnate the paper insulated conductor with the filtrate, and thereafter removing at least the outer and greater part of the said filter and enclosing the impregnated paper insulated conductor within an envelope of liquid-impervious material.

8. In the manufacture of electric cable comprising a conductor having a dielectric of impregnated paper, building a tubular filter around said insulated conductor by lapping it with porous strip material, forcing impregnating liquid radially inward through the said filter to filter the liquid and impregnate the paper-insulated conductor with the filtrate, and thereafter removing at least the outer and greater part of the said filter and enclosing the impregnated paper-insulated conductor within an envelope of liquid-impervious material.

9. A method of making an insulated electric cable which comprises lapping a conductor with paper tapes to form thereon a dielectric layer of paper of appropriate thickness, lapping the paper covered conductor with tapes of liquid-pervious material loaded with a finely divided filter medium to build up around the paper-insulated conductor a tubular filter of laminated form, forcing impregnating liquid radially inward through the said filter to filter the liquid and impregnate the paper-insulated conductor with the filtrate, and thereafter removing the outer and greater part of the tubular filter and enclosing the impregnated paper-insulated conductor within an impervious envelope.

10. A method of making an insulated electric cable which comprises lapping a conductor with paper tapes to form thereon a dielectric layer of paper of appropriate thickness, lapping the paper covered conductor with tapes of liquid-pervious material coated on at least one side with a finely divided filter medium to build up around the paper-insulated conductor a tubular filter of laminated form, forcing impregnating liquid radially inward through the said filter to filter the liquid and impregnate the paper-insulated conductor with the filtrate, and thereafter removing the outer and greater part of the tubular filter and enclosing the impregnated paper-insulated conductor within an impervious envelope.

11. A method of manufacturing an impregnated paper-insulated cable which comprises lapping a paper-insulated conductor with a pair of superposed porous tapes holding sandwiched between them a layer of finely divided filter powder, whereby to build up around the paper-insulated conductor a tubular filter of laminated form, forcing impregnating liquid radially inward through the said filter whereby to filter the liquid and impregnate the paper-insulated conductor with the filtrate, and thereafter removing at least the outer and greater part of the tubular filter and inclosing the impregnated paper-insulated conductor within an impervious envelope.

12. A method of manufacturing an impregnated paper-insulated cable which comprises lapping a paper-insulated conductor with a pair of porous tapes held in superposed relationship by a pair of relatively narrow marginal tapes and containing a finely divided filter powder in the space bounded by the two superposed tapes and the two marginal tapes, whereby to build up around the paper-insulated conductor a tubular filter of laminated form, forcing impregnating liquid radially inward through the said filter to filter the liquid and impregnate the paper-insulated conductor with the filtrate, and thereafter removing at least the outer and greater part of the tubular filter and enclosing the impregnated paper-insulated conductor within an impervious envelope.

RUSSELL SWALE VINCENT.